(12) United States Patent
Kimura et al.

(10) Patent No.: US 9,387,445 B2
(45) Date of Patent: Jul. 12, 2016

(54) SEPARATION MEMBRANE ELEMENT

(75) Inventors: Masahiro Kimura, Otsu (JP);
Katsufumi Oto, Otsu (JP); Kentarou Takagi, Otsu (JP); Hiroho Hirozawa, Otsu (JP); Masakazu Koiwa, Otsu (JP); Yutaro Suzuki, Otsu (JP)

(73) Assignee: TORAY INDUSTRIES, INC., Tokyo (JP)

( * ) Notice: Subject to any disclaimer, the term of this patent is extended or adjusted under 35 U.S.C. 154(b) by 302 days.

(21) Appl. No.: 13/642,449

(22) PCT Filed: Jun. 2, 2011

(86) PCT No.: PCT/JP2011/062673
§ 371 (c)(1),
(2), (4) Date: Nov. 7, 2012

(87) PCT Pub. No.: WO2011/152484
PCT Pub. Date: Dec. 8, 2011

(65) Prior Publication Data
US 2014/0224726 A1 Aug. 14, 2014

(30) Foreign Application Priority Data
Jun. 3, 2010 (JP) ................................. 2010-127655

(51) Int. Cl.
*B01D 69/12* (2006.01)
*B01D 69/06* (2006.01)

(52) U.S. Cl.
CPC ................ *B01D 69/12* (2013.01); *B01D 69/06* (2013.01); *B01D 2313/146* (2013.01); *B01D 2325/06* (2013.01)

(58) Field of Classification Search
CPC .... B01D 69/12; B01D 69/02; B01D 2325/06; B01D 2313/146; B01D 69/06

USPC .......................... 210/483, 488, 489, 490, 491
See application file for complete search history.

(56) References Cited

U.S. PATENT DOCUMENTS 3,872,014 A * 3/1975 Schell ............................ 210/232
5,538,642 A * 7/1996 Solie ...................... B01D 53/22
210/321.83

(Continued)

FOREIGN PATENT DOCUMENTS

JP 9-29071 A 2/1997
JP 2000-288541 A 10/2000

(Continued)

OTHER PUBLICATIONS

English translation Japanese Patent Application No. 2009-057654 A (Mar. 2009).*
International Search Report issued in PCT/JP2011/062673 mailed Sep. 13, 2011.

*Primary Examiner* — John Kim
(74) *Attorney, Agent, or Firm* — Birch, Stewart, Kolasch & Birch, LLP

(57) ABSTRACT

To provide a separation membrane element that is able to increase the amount of permeate fluid per unit time and also able to improve stability performance, provided is a separation membrane element, comprising a separation membrane and a permeate spacer, wherein a separation functional layer is arranged on the surface of said separation membrane and a nonwoven fabric served as a substrate is arranged on the back surface of said separation membrane, wherein said permeate spacer is arranged on the back surface side of said substrate, wherein said permeate spacer is made of a different material from said separation membrane, and a projection area ratio of said permeate spacer to said separation membrane is 0.03 to 0.80.

11 Claims, 1 Drawing Sheet

(56) References Cited

U.S. PATENT DOCUMENTS

| | | |
|---|---|---|
| 6,565,747 B1 | 5/2003 | Shintani et al. |
| 6,656,362 B1 | 12/2003 | Kihara et al. |
| 2004/0195164 A1 | 10/2004 | Hirokawa et al. |
| 2005/0006301 A1* | 1/2005 | Angelini et al. ............... 210/490 |
| 2005/0087070 A1* | 4/2005 | Odaka et al. ...................... 96/11 |
| 2010/0193428 A1* | 8/2010 | Hane et al. .................... 210/489 |

FOREIGN PATENT DOCUMENTS

| | | |
|---|---|---|
| JP | 2000-288542 A | 10/2000 |
| JP | 2000-354742 A | 12/2000 |
| JP | 2001-252543 A | 9/2001 |
| JP | 2004-305823 A | 11/2004 |
| JP | 2009-57654 A | 3/2009 |

* cited by examiner

SEPARATION MEMBRANE ELEMENT

TECHNICAL FIELD

The present invention relates to a separation membrane element used to separate a component contained in fluids such as liquid and gas.

BACKGROUND ART

There are various methods of separating a component contained in fluids such as liquid and gas. For example, taking as an example techniques for removing ionic materials contained in sea water, brackish water, and the like, separation methods using an separation membrane element has been increasingly used in recent years as a process for energy saving and resource saving. Examples of separation membranes used in separation methods using a separation membrane element include, in terms of its pore size and separation function, a microfiltration membrane, an ultrafiltration membrane, a nanofiltration membrane, a reverse osmosis membrane, a forward osmosis membrane, and the like. These membranes are used in obtaining drinking water, for example, from sea water, brackish water, and water containing harmful substances and in the production of industrial ultrapure water, wastewater treatment, recovery of valuables, and the like and used appropriately depending on the desired component to be separated and separation performance.

In recent years, separation membrane elements suitable for purification of sewage (domestic wastewater deriving from cooking, laundering, a bath room, a toilet room, and other living environments) and wastewater deriving from a manufacturing plant, a restaurant, a fish processing plant, a food processing plant, and the like have been widely used in wastewater treatment because the treatment can be carried out in a small space.

The separation membrane elements used in these treatments have in common in that source fluid is fed to one surface of a separation membrane and permeate fluid is obtained from the other surface even if the source fluid to be treated varies. The separation membrane element is constituted such that a number of separation membranes with various shapes is bundled to increase membrane area per unit element to thereby obtain much permeate fluid per unit element. In addition, various elements have been produced according to the intended use and purpose, such as spiral-type, hollow-fiber-type, plate-and-frame-type, rotating flat membrane-type, and integrated flat membrane-type elements.

For example, as a fluid separation membrane element used in reverse osmosis filtration, a spiral-type separation membrane element comprising a water collecting pipe having a hollow portion and a unit comprising a feed spacer that feeds source fluid to a separation membrane surface, a separation membrane that separates components contained in the source fluid, and a permeate spacer for conducting permeate fluid that has permeated through the separation membrane and been separated from the feed fluid (the source fluid at the time when fed to the separation membrane element) to the water collecting pipe, wherein the unit is wound around the water collecting pipe, is widely used because permeate fluid can be taken out in large amounts by putting pressure on the source fluid.

As the feed spacer, a polymer net is mainly used in order to form a flow path for feed fluid (hereinafter referred to as a feed flow path). As the separation membrane, a composite semipermeable membrane in which a separation functional layer mainly composed of crosslinked polymers such as polyamide, a porous support layer composed of polymers such as polysulfone, and a nonwoven fabric composed of polymers such as polyethylene terephthalate, which nonwoven fabric serves as a substrate, are each laminated from the feed side to the permeate side is used. Further, as the permeate spacer, a fabric called a tricot having a narrower interval than that of the feed spacer is used in order to prevent sagging of the membrane and form a flow path for permeate fluid (hereinafter referred to as a permeate flow path).

In recent years, reduction in the cost of water production has been increasingly expected, and accordingly separation membrane elements with higher performance have been demanded. To increase separation performance of a separation membrane element and the amount of permeate fluid per unit time, improvement in performance of each flow path member, separation membranes, and element members has been proposed. For example, in Patent Document 1, the method that uses a sheet the surface of which is shaped into an uneven shape as a permeate spacer has been proposed. In Patent Document 2, the method that does not use a substrate such as a permeate spacer or a feed spacer and uses a flat membrane on the feed surface of which great unevenness is formed and inside which a hollow passage is provided has been proposed. In Patent Document 3, the method that uses a sheet-like composite semipermeable membrane in which a porous support layer having great unevenness on its surface is provided on a nonwoven fabric and a separation active layer is further provided thereon and that does not use a feed spacer such as a net or a permeate spacer such as a tricot has been proposed.

In addition, in the treatment of wastewater such as sewage, for the reduction in the cost of wastewater treatment by a separation membrane element, there is a growing need for water permeability and durability of the membrane element. Thus, as shown in Patent Document 4, a separation membrane element having high water permeability, wherein the rejection rate hardly decreases even when the surface of the separation functional layer is worn; a porous support layer (separation functional layer) is not readily peeled off from a porous substrate such as a nonwoven fabric; and further, even if clogging has once occurred, the clogging substance can be readily removed, has been proposed.

PRIOR ART DOCUMENTS

Patent Documents

Patent Document 1: JP 2006-247453 A
Patent Document 2: JP 11-114381 A
Patent Document 3: JP 2010-99590 A
Patent Document 4: JP 2003-144869 A

SUMMARY OF THE INVENTION

Problems to be Solved by the Invention

However, the separation membrane elements described above are not sufficient in terms of improvement in performance, in particular, stable performance during the operation over a long period of time. For example, for the method described in Patent Document 1, only the flow resistance at the permeate side is reduced, and the flow resistance-reducing effect is not sufficient due to the resistance on the sheet surface. For the method described in Patent Document 2, because of having a hollow passage extending in the direction parallel to the membrane surface in a flat membrane, it is difficult to increase the height of unevenness on the surface, and the uneven shape is limited (a groove with a level difference of 0.15 mm in Examples) and the shape of the permeate flow path is also limited; thus the effect of reducing the flow resistance at the feed side and at the permeate side is not sufficient. For the method described in Patent Document 3, only the membrane performance when using a cell for flat membrane evaluation is described in Examples of Patent Document 3, and the performance when a separation membrane element is actually constituted is not disclosed in Patent Document 3; when the separation membrane element is actually operated with pressure thereon, the cross-sectional area of the feed fluid and permeate flow path is prone to change, and the performance tends to change during the operation over a long period of time.

On the other hand, the separation membrane element described in Patent Document 4 as a separation membrane element suitable for treatment of, for example, sewage has an effect on the improvement of durability but, in terms of water permeability, requires improvement because the design of a spacer is not sufficient.

Thus an object of the present invention is to provide a separation membrane element that is able to increase the amount of permeate fluid per unit time and also able to improve stability performance.

Means for Solving the Problems

The present invention for achieving the object described above has any of the constitution below.
(1) A separation membrane element comprising a separation membrane and a permeate spacer,
wherein a separation functional layer is arranged on the surface of said separation membrane and a nonwoven fabric served as a substrate is arranged on the back surface of said separation membrane,
wherein said permeate spacer is arranged on the back surface side of said substrate,
wherein said permeate spacer is made of a different material from said separation membrane, and a projection area ratio of said permeate spacer to said separation membrane is 0.03 to 0.80.
(2) The separation membrane element according to (1) above, wherein the above-described permeate spacer has a discontinuous structure.
(3) The separation membrane element according to (1) or (2) above, wherein the above-described permeate spacer is impregnated into the separation membrane by 1 to 80 μm.
(4) The separation membrane element according to any one of (1) to (3) above, wherein the above-described separation membrane has a height difference on the surface of 100 μm to 2000 μm.
(5) The separation membrane element according to any one of (1) to (3) above, wherein a feed spacer is arranged on the surface of the above-described separation membrane.
(6) The separation membrane element according to (5) above, wherein the above-described feed spacer has a continuous structure.
(7) The separation membrane element according to (5) above, wherein the above-described feed spacer has a discontinuous structure.
(8) The separation membrane element according to any one of (1) to (7) above, wherein the above-described separation membrane is composed of the above-described substrate, a porous support layer formed on the substrate, and the separation functional layer formed on the porous support layer.
(9) The separation membrane element according to (8) above, wherein the above-described substrate is a continuous-fiber nonwoven fabric.
(10) The separation membrane element according to (9) above, wherein in the above-described continuous-fiber nonwoven fabric, fibers on a surface layer on the opposite side to the above-described porous support layer are more longitudinally oriented than fibers on a surface layer on the above-described porous support layer side.
(11) The separation membrane element according to any one of (1) to (7) above, wherein the above-described separation membrane is composed of the above-described substrate and the separation functional layer formed on the substrate.

Effects of the Invention

According to the present invention, by placing a permeate spacer of a different material having a particular projection area ratio to a separation membrane on the permeate side of a separation membrane element, a stable permeate flow path that provides a reduced flow resistance and does not readily undergo a change over time is formed, and a separation membrane element having an enhanced permeation performance while maintaining the separation performance can be obtained. Consequently, a separation membrane element having both a high separation performance and a high permeation performance can be obtained.

BEST MODE FOR CARRYING OUT THE INVENTION

Figure 1:
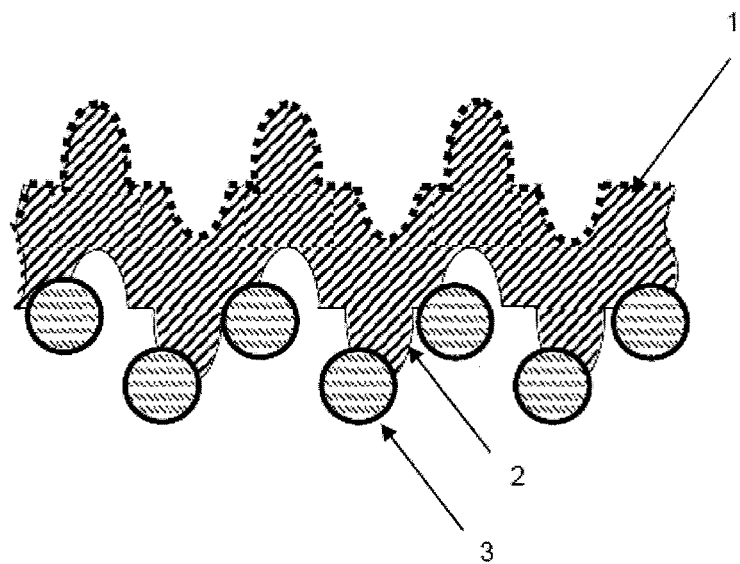
FIG. 1 is a cross-sectional schematic view illustrating one aspect of the separation membrane and the permeate spacer in the separation membrane element of the present invention.
Figure 2:
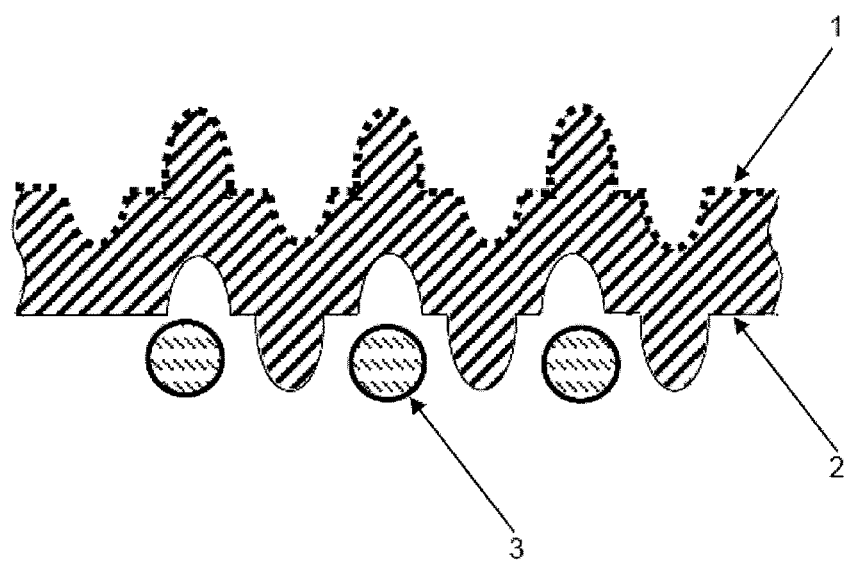
FIG. 2 is a cross-sectional schematic view illustrating another aspect of the separation membrane and the permeate spacer in the separation membrane element of the present invention.

The present invention will now be described in more detail.

The present invention is a separation membrane element comprising a separation membrane and a permeate spacer. The permeate spacer is made of a different material from the separation membrane and have a projection area ratio to the separation membrane of 0.03 to 0.80. Preferably, the permeate spacer is composed of a discontinuous structure.

The separation membrane herein refers to a membrane that separates components in fluid fed to a separation membrane surface to obtain a permeate fluid that has permeated through the separation membrane, and examples thereof include i) those composed of a separation functional layer, a porous support layer, and a substrate and ii) those composed of a separation functional layer and a substrate. In the separation membrane of ii), the separation functional layer in the separation membrane of i) is not provided, and the porous support layer in the separation membrane of i) is used as a separation functional layer.

In the separation membrane in the form of i) described above, a crosslinked polymer is used as a separation functional layer in terms of, for example, pore size control and durability. Specifically, on the porous support layer mentioned below, a polyamide separation functional layer obtained by polycondensation of polyfunctional amines with polyfunctional acid halides, an organic-inorganic hybrid functional layer, and the like can be suitably used in terms of separation performance.

On the other hand, the separation functional layer in the separation membrane of ii) described above is not particularly limited as long as it has a separation function and a mechanical strength required for the separation membrane element, and preferably formed, for example, from cellulose, a polyethylene resin, a polypropylene resin, a polyvinyl chloride resin, a polyvinylidene fluoride resin, a polysulfone resin, a polyethersulfone resin, a polyimide resin, a polyetherimide resin, and the like. It may be a layer comprising these resins as a principal component. The principal component herein refers to the content of 50% by weight or more and preferably 60% by weight or more. In particular, preferred is a layer composed, for example, of a polyvinyl chloride resin, a polyvinylidene fluoride resin, a polysulfone resin, and a polyethersulfone resin, which are readily formed into a membrane from a solution and have excellent physical durability and chemical resistance. Specifically, for example, a solution of polysulfone in N,N-dimethylformamide (hereinafter referred to as DMF) is cast onto the below-mentioned substrate, i.e., nonwoven fabric to a uniform thickness, and the resultant is subjected to wet coagulation in water, whereby the layer can be produced.

The porous support layer in the separation membrane of i) described above and the separation functional layer in the separation membrane of ii) described above can be produced according to the method described in "Office of saline Water Research and Development Progress Report" No. 359 (1968) by adjusting the polymer concentration, solvent temperature, and poor solvent in order to obtain the form mentioned above. For example, a given amount of polysulfone is dissolved in dimethylformamide (hereinafter referred to as DMF) to prepare a given concentration of a polysulfone resin solution. Next, the polysulfone resin solution is applied on a substrate comprising a nonwoven fabric to a substantially uniform thickness, and then the solvent on the surface is removed in air for a certain period of time, after which the polysulfone is coagulated in a coagulating liquid, whereby the layers can be obtained. In this process, at the surface portion in contact with the coagulating liquid, the solvent DMF rapidly diffuses and, at the same time, coagulation of polysulfone proceeds quickly, generating fine continuous pores the core of which is the portion where DMF existed.

At the inner part directing from the surface portion described above to the substrate side, diffusion of DMF and coagulation of polysulfone proceed more slowly than at the surface, and therefore DMF readily aggregates to form a large core; consequently, the resulting continuous pores will have a larger diameter. Needless to say, because the core-formation conditions described above varies slightly with the distance from the surface, a layer having a smooth pore size distribution with no definite boundary will be formed. By adjusting the temperature of the polysulfone resin solution used in this formation process and the concentration of polysulfone, the relative humidity of an atmosphere in which application is performed, the time from application until immersion into a coagulating liquid, the temperature and composition of a coagulating liquid, and the like, a layer having a controlled average porosity and average pore size can be obtained.

Further, the separation functional layer constituting the separation membrane of i) described above can be produced as described below. The separation functional layer constituting the separation membrane of i) described above that is suitably used in obtaining drinking water, for example, from sea water, brackish water, and water containing harmful substances and in the production of industrial ultrapure water can be composed of polyamide. The separation functional layer of polyamide can be formed on a porous support layer by interfacial polycondensation of polyfunctional amines with polyfunctional acid halides. Here, at least one of the polyfunctional amines and the polyfunctional acid halides preferably contain a tri- or more functional compound.

The polyfunctional amine herein refers to an amine having at least two primary amino groups and/or secondary amino groups in one molecule, at least one of the amino groups being a primary amino group.

Examples thereof include alicyclic polyfunctional amines such as phenylenediamine and xylylenediamine, in which two amino groups are attached to a benzene ring in any of ortho, meta, and para relationship, 1,3,5-triaminobenzene, 1,2,4-triaminobenzene, 3,5-diaminobenzoic acid, 3-aminobenzylamine, and 4-aminobenzylamine; aliphatic amines such as ethylenediamine and propylenediamine; and alicyclic polyfunctional amines such as 1,2-diaminocyclohexane, 1,4-diaminocyclohexane, 4-aminopiperidine, and 4-aminoethylpiperazine.

In particular, an aromatic polyfunctional amine having 2 to 4 primary amino groups and/or secondary amino groups in one molecule is preferred in view of the selective separation performance, permeability, and heat resistance of the membrane, and m-phenylenediamine, p-phenylenediamine, and 1,3,5-triaminobenzene are suitably used as such a polyfunctional aromatic amine. Among them, it is more preferable to use m-phenylenediamine (hereinafter referred to as m-PDA) in terms of availability and handleability.

These polyfunctional amines may be used alone, or two or more of them may be used simultaneously. When two or more of them are used simultaneously, the above-described amines may be used in combination, or the above-described amine and an amine having at least two secondary amino groups in one molecule may be used in combination. Examples of amines having at least two secondary amino groups in one molecule include piperazine, 1,3-bis(piperidyl)propane, and the like.

The polyfunctional acid halide refers to an acid halide having at least two halogenated carbonyl groups in one molecule.

Examples of trifunctional acid halides include trimesic acid chloride, 1,3,5-cyclohexanetricarboxylic acid trichloride, 1,2,4-cyclobutanetricarboxylic acid trichloride, and the like, and examples of bifunctional acid halides include aromatic bifunctional acid halides such as biphenyldicarboxylic acid dichloride, azobenzenedicarboxylic acid dichloride, terephthalic acid chloride, isophthalic acid chloride, and naphthalene dicarboxylic acid chloride; aliphatic bifunctional acid halides such as adipoyl chloride and sebacoyl chloride; and alicyclic bifunctional acid halides such as cyclopentane dicarboxylic acid dichloride, cyclohexanedicarboxylic acid dichloride, and tetrahydrofuran dicarboxylic acid dichloride.

In view of reactivity with polyfunctional amines, the polyfunctional acid halide is preferably a polyfunctional acid chloride, and in view of the selective separation performance and heat resistance of the membrane, it is preferably a polyfunctional aromatic acid chloride having 2 to 4 carbonyl chloride groups in one molecule. In particular, it is more preferable to use trimeric acid chloride from the standpoint of availability and handleability.

These polyfunctional acid halides may be used alone, or two or more of them may be used simultaneously.

To provide the separation functional layer surface with a height difference by forming (such as injection forming, vacuum forming, pressure forming, mold forming, embossing, transfer processing, and thermoplastic resin processing) while maintaining the separation performance thereafter, the molar ratio of a bifunctional acid halogen compound to a trifunctional halogen compound (the mole of the bifunctional acid halogen compound/the mole of the trifunctional acid halogen compound) is preferably 0.05 to 1.5 and more preferably 0.1 to 1.0. In the present invention, as mentioned below, it is preferable to provide unevenness with a height difference in the range of 100 to 2000 μm on the surface of the final separation membrane.

Further, as a separation membrane constituting the separation membrane of i) described above, a separation membrane in which the separation functional layer has an organic-inorganic hybrid structure having, for example, a Si element in terms of chemical resistance can also be used. Examples of the separation functional layer having an organic-inorganic hybrid structure that can be used include, but are not limited to, (A) a silicon compound in which a reactive group(s) having an ethylenically unsaturated group and a hydrolyzable group(s) are bonded directly to a silicon atom, and (B) a condensation product of hydrolyzable groups of a silicon compound (A) and a polymerization product of ethylenically unsaturated groups of a silicon compound (A) and of a compound (B) having an ethylenically unsaturated group, which (B) uses a compound having an ethylenically unsaturated group other than the above-described silicon compound.

First, (A) the silicon compound in which a reactive group(s) having an ethylenically unsaturated group and a hydrolyzable group(s) are bonded directly to a silicon atom will be described.

The reactive group having an ethylenically unsaturated group is bonded directly to a silicon atom. Examples of such reactive groups include vinyl, allyl, methacryloxyethyl, methacryloxypropyl, acryloxyethyl, acryloxypropyl, and styryl. From the standpoint of polymerizability, methacryloxypropyl, acryloxypropyl, and styryl are preferred.

Through processes such as a change of the hydrolyzable group bonded directly to a silicon atom to a hydroxyl group, a condensation reaction takes place in which silicon compounds are bonded to each other by siloxane bond to give a polymer. Examples of the hydrolyzable group include functional groups such as alkoxy, alkenyloxy, carboxyl, ketoxime, aminohydroxyl, halogen atoms, and isocyanate. The alkoxy group is preferably $C_1$-$C_{10}$ alkoxy and more preferably $C_1$-$C_2$ alkoxy. The alkenyloxy group is preferably $C_2$-$C_{10}$ alkenyloxy, more preferably $C_2$-$C_4$ alkenyloxy, and still more preferably $C_3$ alkenyloxy. The carboxyl group is preferably $C_2$-$C_{10}$ carboxyl and more preferably $C_2$ carboxyl, i.e., acetoxy. Examples of the ketoxime group include methyl ethyl ketoxime, dimethyl ketoxime, and diethyl ketoxime. Aminohydroxyl group is a group in which an amino group is bonded through oxygen to a silicon atom through an oxygen atom. Examples thereof include dimethyl aminohydroxyl, diethyl aminohydroxyl, and methyl ethyl aminohydroxyl. As a halogen atom, a chlorine atom is preferably used.

In forming a separation functional layer, a silicon compound having a silanol structure as a result of hydrolysis of some of the hydrolyzable groups described above can also be used. Further, two or more silicon compounds that have undergone an increase in molecular weight to the extent that some of the hydrolyzable groups are hydrolyzed, condensed, but not cross-linked can also be used.

The silicon compound (A) is preferably represented by Formula (a) below.

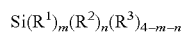    (a)

($R^1$ represents a reactive group including an ethylenically unsaturated group. $R^2$ represents any of alkoxy, alkenyloxy, carboxyl, ketoxime, a halogen atom, or isocyanate. $R^3$ represents H or alkyl. m and n are an integer satisfying m+n≤4, provided that m≥1 and n≥1 are satisfied. In each of $R^1$, $R^2$, and $R^3$, when two or more functional groups are bonded to a silicon atom, they may be the same or different.)

$R^1$ is a reactive group including an ethylenically unsaturated group as described above.

$R^2$ is a hydrolyzable group as described above. The carbon number of the alkyl of $R^3$ is preferably 1 to 10 and more preferably 1 to 2.

As the hydrolyzable group, alkoxy is preferably used because it provides a reaction solution with viscosity in forming a separation functional layer.

Examples of such silicon compounds include vinyltrimethoxysilane, vinyltriethoxysilane, styryltrimethoxysilane, methacryloxypropylmethyldimethoxysilane, methacryloxypropyltrimethoxysilane, methacryloxypropylmethyldiethoxysilane, methacryloxypropyltriethoxysilane, and acryloxypropyltrimethoxysilane.

In addition to (A) the silicon compound, a silicon compound that does not have a reactive group having an ethylenically unsaturated group but has a hydrolyzable group can also be used in combination. Examples of such silicon compounds include a compound wherein m is zero in Formula (a), although defined as "m≥1" in Formula (a). Examples thereof include tetramethoxysilane, tetraethoxysilane, methyltrimethoxysilane, and methyltriethoxysilane.

(B) the compound having an ethylenically unsaturated group, which excludes (A) the silicon compound, will now be described.

The ethylenically unsaturated group is addition polymerizable. Examples of such compounds include ethylene, propylene, methacrylic acid, acrylic acid, styrene, and derivatives thereof.

Such a compound is preferably an alkali-soluble compound having an acid radical in order to enhance selective permeability of water and increase the salt rejection rate when a separation membrane is used, for example, for separation of an aqueous solution.

Preferred acid structures are carboxylic acid, phosphonic acid, phosphoric acid, and sulfonic acid, and these acid structures may exist in any state of the form of an acid, an ester compound, and a metal salt. Such compounds having one or more ethylenically unsaturated groups can contain two or more acids, and, in particular, compounds containing 1 to 2 acid radicals are preferred.

Examples of the compound having a carboxylic acid group among the above-described compounds having one or more ethylenically unsaturated groups include the following: maleic acid, maleic anhydride, acrylic acid, methacrylic acid, 2-(hydroxymethyl)acrylic acid, 4-(meth)acryloyloxyethyl trimellitic acid and corresponding anhydrides, 10-methacryloyloxydecyl malonic acid, N-(2-hydroxy-3-methacryloyloxypropyl)-N-phenylglycine, and 4-vinylbenzoic acid.

Examples of the compound having a phosphonic acid group among the above-described compounds having one or more ethylenically unsaturated groups include vinyl phosphonic acid, 4-vinylphenyl phosphonic acid, 4-vinylbenzyl phosphonic acid, 2-methacryloyloxyethyl phosphonic acid, 2-methacrylamidoethyl phosphonic acid, 4-methacrylamide-4-methyl-phenyl-phosphonic acid, 2-[4-(dihydroxyphosphoryl)-2-oxa-butyl]-acrylic acid, and 2-[2-dihydroxyphosphoryl)-ethoxymethyl]-acrylic acid-2,4,6-trimethyl-phenyl ester.

Examples of the phosphate ester compound among the above-described compounds having one or more ethylenically unsaturated groups include 2-methacryloyloxypropyl monohydrogen phosphate and 2-methacryloyloxypropyl dihydrogen phosphate, 2-methacryloyloxyethyl monohydrogen phosphate and 2-methacryloyloxyethyl dihydrogen phosphate, 2-methacryloyloxyethyl-phenyl-hydrogen phosphate, dipentaerythritol-pentamethacryloyloxy phosphate, 10-methacryloyloxydecyl-dihydrogen phosphate, dipentaerythritol pentamethacryloyloxy phosphate, phosphoric acid mono-(1-acryloyl-piperidin-4-yl)-ester, 6-(methacrylamide)hexyl dihydrogen phosphate, and 1,3-bis-(N-acryloyl-N-propyl-amino)-propan-2-yl-dihydrogen phosphate.

Examples of the compound having a sulfonic group among the above-described compounds having one or more ethylenically unsaturated groups include vinyl sulfonic acid, 4-vinylphenyl sulfonic acid, and 3-(methacrylamide)propyl sulfonic acid.

To form a separation functional layer having an organic-inorganic hybrid structure, (B) the compound having one or more ethylenically unsaturated groups and a reaction solution containing a polymerization initiator are used in addition to (A) the silicon compound. It is necessary to apply this reaction solution on the porous support layer mentioned below, further condense the hydrolyzable groups, and besides polymerize the ethylenically unsaturated groups, thereby increasing the molecular weight of these compounds.

When (A) the silicon compound is condensed alone, the concentration of cross-linked chain bonds at silicon atoms produces a large density difference between the vicinity of the silicon atoms and parts distant from the silicon atoms, and consequently the pore size in the separation functional layer tends to be ununiform. On the other hand, in addition to the increase in molecular weight and cross-linking of (A) the silicon compound itself, copolymerization with (B) the compound having an ethylenically unsaturated group moderately disperses the cross-linking points formed by condensation of hydrolyzable groups and the cross-linking points formed by polymerization of ethylenically unsaturated groups. Such a moderate dispersion of the cross-linking points forms a separation functional layer having a uniform pore size, and a composite semipermeable membrane having well-balanced water permeation performance and rejection performance can be obtained. In this case, the compound having one or more ethylenically unsaturated groups, if its molecular weight is low, can dissolve and cause membrane performance degradation during the use of a composite semipermeable membrane, and thus the molecular weight needs to be increased.

In such a production method, the content of (A) the silicon compound in which a reactive group(s) having an ethylenically unsaturated group and a hydrolyzable group(s) are bonded directly to a silicon atom is preferably not less than 10 parts by weight and more preferably 20 parts by weight to 50 parts by weight, based on 100 parts by weight of the solid content contained in the reaction solution. The solids contained in the reaction solution herein refers to components contained finally in the resulting composite semipermeable membrane as a separation functional layer, which is components other than components to be distilled such as water and alcohol produced in condensation reaction and solvents among all the components contained in the reaction solution. If the content of (A) the silicon compound is small, the degree of cross-linking tends to be insufficient, which can cause problems such as degradation of separation performance due to dissolution of the separation functional layer during membrane filtration.

The content of (B) the compound having an ethylenically unsaturated group is preferably not more than 90 parts by weight and more preferably 50 parts by weight to 80 parts by weight, based on 100 parts by weight of the solid content contained in the reaction solution. When the content of (B) the compound is within these ranges, the resulting separation functional layer will have a high degree of cross-linking, and consequently membrane filtration can be carried out stably without dissolution of the separation functional layer.

The method of forming the separation functional layer having an organic-inorganic hybrid structure as described above on a porous support layer will now be described.

In the method exemplified for separation functional layer formation, the step of applying a reaction solution containing (A) the silicon compound and (B) the compound having an ethylenically unsaturated group, the step of removing a solvent, the step of polymerizing ethylenically unsaturated groups, and the step of condensing hydrolyzable groups are performed in the order mentioned. In the step of polymerizing ethylenically unsaturated groups, hydrolyzable groups, in some cases, may be condensed at the same time.

First, a reaction solution containing (A) and (B) is brought into contact with the porous support layer mentioned below. Such a reaction solution is generally a solution containing a solvent, and such a solvent is not particularly limited as long as it does not break a porous support layer and dissolves (A), (B), and polymerization initiators added as required. To this reaction solution, it is preferable to add water of 1 to 10 times molar quantity and preferably 1 to 5 times molar quantity relative to the molar number of (A) the silicon compound together with an inorganic acid or an organic acid to promote hydrolysis of (A) the silicon compound.

As a solvent in the reaction solution, water, alcohol-based organic solvents, ether-based organic solvents, ketone-based organic solvents, and mixtures thereof are preferred. Examples of alcohol-based organic solvents include methanol, ethoxymethanol, ethanol, propanol, butanol, amyl alcohol, cyclohexanol, methylcyclohexanol, ethylene glycol monomethyl ether (2-methoxyethanol), ethylene glycol monoaceto ester, diethylene glycol monomethyl ether, diethylene glycol monoacetate, propylene glycol monoethyl ether, propylene glycol monoacetate, dipropylene glycol monoethyl ether, methoxybutanol, and the like. Examples of ether-based organic solvents include methylal, diethyl ether, dipropyl ether, dibutyl ether, diamyl ether, diethyl acetal, dihexyl ether, trioxane, and dioxane. Examples of ketone-based organic solvents include acetone, methyl ethyl ketone, methyl propyl ketone, methyl isobutyl ketone, methyl amyl ketone, methyl cyclohexyl ketone, diethyl ketone, ethyl butyl ketone, trimethylnonanone, acetonitrile acetone, dimethyl oxide, phorone, cyclohexanone, and diacetone alcohol.

The amount of the solvent is preferably 50 to 99 parts by weight % and more preferably 80 to 99 parts by weight %. When the amount of the solvent is too large, defects tend to occur in the membrane, and when the amount of the solvent is too small, the water permeability of the resulting separation membrane tends to be low.

The contact of the porous support layer with the reaction solution described above is preferably carried out uniformly and continuously on the porous support layer. Specific examples thereof include the method of coating the porous support layer with the reaction solution using a coating applicator such as a spin coater, a wire bar, a flow coater, a die coater, a roll coater, or a sprayer. Another example is the method of immersing the porous support layer in the reaction solution.

In the case of immersion, the contact time of the porous support layer with the reaction solution is preferably in the range of 0.5 to 10 minutes and more preferably in the range of 1 to 3 minutes. After the reaction solution has been brought into contact with the porous support layer, it is preferable to drain the solution sufficiently so that droplets would not remain on the porous support layer. Sufficient draining prevents degradation of membrane performance due to the membrane defects resulting from the part where the droplets remained after membrane formation. Examples of the method of draining the solution that can be used include holding vertically the porous support layer after the contact with the reaction solution to subject the excess reaction solution to gravity flow, blowing air such as nitrogen from an air nozzle to compulsorily drain the solution, and the like. After the draining, the membrane surface can also be dried to remove a portion of the solvent in the reaction solution.

The step of condensing the hydrolyzable groups of silicon is performed by heat treatment after the contact of the reaction solution with the porous support layer. The heating temperature in this step is required to be lower than the temperature that melts the porous support layer and degrades the performance as a separation membrane. In order that the condensation reaction proceeds rapidly, in general, heating is preferably carried out at 0° C. or higher and more preferably 20° C. or higher. Further, the reaction temperature is preferably not higher than 150° C. and more preferably not higher than 100° C. When the reaction temperature is 0° C. or higher, the hydrolysis and the condensation reaction proceed rapidly, and when not higher than 150° C., the hydrolysis and the condensation reaction can be readily controlled. Further, by adding a catalyst that promotes hydrolysis or condensation, the reaction can proceed even at a lower temperature. Furthermore, heating conditions and humidity conditions are selected such that the separation functional layer will have pores so as to carry out the condensation reaction appropriately.

The polymerization of ethylenically unsaturated groups of (A) the silicon compound and (B) the compound having an ethylenically unsaturated group can be carried out by methods such as heat treatment, electromagnetic wave irradiation, electron beam irradiation, and plasma irradiation. The electromagnetic wave herein includes infrared ray, ultraviolet ray, X-ray, gamma-ray, and the like. The polymerization method may be selected optimally as appropriate, and the polymerization using electromagnetic wave irradiation is preferred in terms of for example, running costs and productivity. Among the electromagnetic waves, infrared ray irradiation and UV irradiation are more preferred in terms of convenience. When the polymerization is practiced using infrared rays or ultraviolet rays, these light sources need not selectively emit only the light in these wavelength regions and need only include the electromagnetic waves in these wavelength regions. However, in terms of ease of for example, shortening of polymerization time and control of polymerization conditions, the intensity of these electromagnetic waves is preferably higher than that of the electromagnetic waves in other wavelength regions.

The electromagnetic waves can be generated from a halogen lamp, a xenon lamp, a UV lamp, an excimer lamp, a metal halide lamp, a noble gas fluorescent lamp, a mercury lamp, and the like. Although the energy of the electromagnetic waves is not particularly restricted as long as polymerization can be carried out, in particular, high-efficiency and low-wavelength ultraviolet rays have high thin membrane-forming properties. Such ultraviolet rays can be generated by a low-pressure mercury lamp and an excimer laser lamp. The thickness and form of the separation functional layer can vary significantly depending on each polymerization condition and can vary significantly depending on the wavelength and intensity of electromagnetic waves, the distance to an object to be irradiated, and the processing time in the case of polymerization using electromagnetic waves. Accordingly, these conditions need to be optimized as appropriate.

For the purpose of increasing the polymerization rate, it is preferable to add a polymerization initiator, a polymerization accelerator, and the like in forming a separation functional layer. The polymerization initiator and the polymerization accelerator are not particularly limited and appropriately selected depending, for example, on the structure of the compound used and the polymerization method.

Examples of the polymerization initiator are given below. Examples of initiators for polymerization using electromagnetic waves include benzoin ether, dialkyl benzyl ketal, dialkoxyacetophenone, acylphosphine oxide or bisacylphosphine oxide, α-diketones (for example, 9,10-phenanthrenequinone), diacetylquinone, furylquinone, anisylquinone, 4,4'-dichlorobenzylquinone and 4,4'-dialkoxybenzylquinone, and camphorquinone. Examples of initiators for polymerization using heat include azo compounds (for example, 2,2'-azobis(isobutyronitrile) (AIBN) or azobis-(4-cyanovalerianic acid)), peroxides (for example, dibenzoyl peroxide, dilauroyl peroxide, tert-butyl peroctoate, tert-butyl perbenzoate, or di-(tert-butyl)peroxide), further, aromatic diazonium salts, bis-sulfonium salts, aromatic iodonium salts, aromatic sulfonium salts, potassium persulfate, ammonium persulfate, alkyl lithium, cumyl potassium, sodium naphthalene, and distyryl dianion. In particular, benzopinacol and 2,2'-dialkylbenzopinacol are particularly preferred as an initiator for radical polymerization.

Peroxides and α-diketones are preferably used in combination with an aromatic amine in order to accelerate the initiation. These combinations are also called redox system. Examples of such a system include the combination of benzoyl peroxide or camphorquinone with an amine (for example, N,N-dimethyl-p-toluidine, N,N-dihydroxyethyl-p-toluidine, p-dimethyl-ethyl aminobenzoate ester, or a derivative thereof). In addition, a system that contains peroxide in combination with ascorbic acid, barbiturate, or sulfinic acid, which acts as a reducing agent, is also preferred.

Then, polycondensation reaction occurs upon heat treatment at about 100 to 200° C., and a separation functional layer derived from a silane coupling agent is formed on the porous support layer surface. Although the heating temperature depends on the material of the porous support layer, when it is too high, dissolution occurs and pores of the porous support layer are blocked, and consequently the final separation membrane will have a reduced water producing capacity. On the other hand, when it is too low, insufficient polycondensation reaction causes dissolution of the separation functional layer, thereby decreasing the rejection rate.

In the production method described above, the step of increasing the molecular weight of the silane coupling agent and the compound having one or more ethylenically unsaturated groups may be performed before or after the step of polycondensing the silane coupling agent. Alternatively, the step may be performed at the same time.

Although the separation membrane having an organic-inorganic hybrid structure thus obtained can be used as it is, it is preferable to hydrophilize the surface of the membrane before use, for example, with an alcohol-containing aqueous solution or an aqueous alkaline solution.

The separation functional layer constituting the separation membrane of ii) described above that is suitably used, for example, in sewage treatment will now be described in detail.

With respect to such a separation functional layer, first, a coating of the starting solution containing a resin and a solvent mentioned above is formed on the surface of a substrate (nonwoven fabric), and the starting solution is impregnated into the substrate. Thereafter, only the coated surface of the substrate having the coating is brought into contact with a coagulation bath containing a non-solvent to coagulate the resin, thereby forming a porous support layer that serves as a separation functional layer on the surface of the substrate. In general, the temperature of the starting solution is preferably selected from within the range of 0 to 120° C. from the standpoint of membrane-forming properties.

To the starting solution, a pore-forming agent can also be added. The pore-forming agent has the effect of making a resin layer porous by being extracted when immersed in the coagulation bath. The pore-forming agent is preferably highly soluble in the coagulation bath. For example, inorganic salts such as calcium chloride and calcium carbonate can be used. Further, polyoxyalkylenes such as polyethylene glycol and polypropylene glycol; water-soluble polymers such as polyvinyl alcohol, polyvinyl butyral, and polyacrylic acid; and glycerin can be used.

The solvent dissolves the resin. The solvent acts on the resin and the pore-forming agent and promotes the formation of a porous support layer by them. Examples of the solvent that can be used include N-methylpyrrolidinone (NMP), N,N-dimethylacetamide (DMAc), N,N-dimethylformamide (DMF), dimethyl sulfoxide (DMSO), acetone, and methyl ethyl ketone. Among them, NMP, DMAc, DMF, and DMSO, in which resins are highly soluble, can preferably be used.

Further, a non-solvent can also be added to the starting solution. The non-solvent is a liquid that does not dissolves the resin. The non-solvent has the effect of controlling the coagulation rate of the resin to control the pore size. Examples of non-solvents that can be used include water and alcohols such as methanol and ethanol. Among them, water and methanol are preferred in terms of ease of wastewater treatment and costs. A mixture thereof may also be used.

In the starting solution, it is preferred that the resin be in an amount in the range of 5 to 40% by weight and the solvent be in an amount in the range of 40 to 95% by weight. When the amount of the resin is extremely small, the strength of the porous support layer decreases, and when it is too large, the water permeability can be reduced. More preferably, the amount of the resin is in the range of 8 to 25% by weight. When the amount of the solvent is too small, the starting solution is prone to gelation, and when it is too large, the strength of the porous support layer can decrease. More preferred range is 50 to 90% by weight.

In this case, in the coagulation bath, it is preferred that the solvent be in the range of 40 to 95% by weight and the non-solvent be contained in an amount of at least 5% by weight. When the amount of the solvent is less than 40% by weight, the resin coagulates at a faster rate, resulting in smaller pore size. When the amount of the solvent is more than 95% by weight, the resin does not coagulate, and consequently the porous support layer can hardly be formed. More preferred range is 50 to 90% by weight. When the temperature of the coagulation bath is too high, the coagulation rate becomes too fast, whereas when it is too low, the coagulation rate becomes too low, and therefore, in general, it is preferable to select from within the range of 0 to 100° C. More preferred temperature range is 10 to 80° C.

The method of bringing only the coated surface of the substrate having the coating into contact with the coagulation bath is not particularly limited. Examples thereof include, for example, the method in which the substrate having the coating is brought into contact with the coagulation bath surface with the coated surface down, and the method in which the opposite side to the coated side is brought into contact with a flat plate such as a glass plate or a metal plate and stuck to the flat plate such that the coagulation bath will not enter the back side, and the substrate having the coating is immersed in the coagulation bath together with the plate. In the latter method, the substrate may be stuck to the plate before forming a coating of the starting solution, or the substrate may be stuck to the plate after forming a coating of the starting solution on the substrate.

The formation of a coating of the starting solution on the substrate can be achieved by applying the starting solution to the substrate or by immersing the substrate in the starting solution. When the starting solution is applied, it may be applied on one surface of the substrate or may be applied on both the surface. Depending on the composition of the starting solution, if a porous substrate with a density of not more than 0.7 g/cm$^3$ is used in the application, the starting solution will be moderately impregnated into the porous substrate.

In the porous support layer (separation functional layer) of the separation membrane prepared as described above, the average pore size on the surface brought into contact with the coagulation bath is twice or more as large as the average pore size on the other surface. This is because the replacement rate between the starting solution and the coagulation bath is relatively slow because the coagulation bath contains a solvent in an amount of 40 to 95% by weight, and, in the porous support layer, the growth of the pores progresses and the pore size becomes large on the surface brought into contact with the coagulation bath, whereas on the opposite surface, pores are formed only by phase separation of the starting solution because of not being in contact with the coagulation bath, resulting in relatively small pore size. For this reason, the separation membrane thus obtained is preferably used such that the surface brought into contact with the coagulation bath is at the side of the solution to be treated and the other surface at the side of the permeate solution.

Further, the separation functional layer in the separation membrane of ii) described above that is suitably used, for example, in sewage treatment can be produced also by the method described below with addition of a pore-forming agent to the starting solution.

Namely, a starting solution containing a resin, a pore-forming agent, and a solvent is used as the starting solution mentioned above. To the starting solution, a non-solvent may be further added.

The pore-forming agent has the effect of making a resin layer porous by being extracted when immersed in the coagulation bath. The pore-forming agent is preferably highly soluble in the coagulation bath. For example, inorganic salts such as calcium chloride and calcium carbonate can be used. Further, polyoxyalkylenes such as polyethylene glycol and polypropylene glycol; water-soluble polymers such as polyvinyl alcohol, polyvinyl butyral, and polyacrylic acid; and glycerin can be used.

As a solvent and a non-solvent, those similar to the above can be used.

In the starting solution, it is preferred that the resin be in an amount in the range of 5 to 40% by weight, the pore-forming agent be in an amount in the range of 0.1 to 15% by weight, the solvent be in an amount in the range of 40 to 94.9% by weight, and the non-solvent be in an amount in the range of 0 to 20% by weight. When the amount of the resin is extremely small, the strength of the porous support layer decreases, and when it is too large, the water permeability can be reduced. The resin content in the starting solution is more preferably in the range of 8 to 25% by weight. When the amount of the pore-forming agent is too small, the water permeability can be reduced, and when it is too large, the strength of the porous support layer can decrease. Further, when the amount of the pore-forming agent is extremely large, the pore-forming agent remains in the porous resin and dissolves during use, which can deteriorate water quality of permeate water and fluctuate the water permeability. More preferred range of the pore-forming agent content in the starting solution is 0.5 to 10% by weight. Further, when the amount of the solvent is too small, the starting solution is prone to gelation, and when it is too large, the strength of the porous support layer can decrease. When a non-solvent is not used, the solvent content in the starting solution is more preferably in the range of 55 to 94.9% by weight and still more preferably in the range of 60 to 90% by weight. When the amount of the non-solvent is too large, gelation of the starting solution readily occurs, and when it is extremely small, it is difficult to control the pore size. The non-solvent content in the starting solution is more preferably in the range of 0.5 to 15% by weight.

As a coagulation bath, a non-solvent or a mixed solution containing a non-solvent and a solvent can be used. In the coagulation bath, the non-solvent is preferably in an amount of at least 80% by weight when a non-solvent is used in the starting solution. When the amount of the non-solvent is too small, the coagulation rate of the resin decreases, which can lead to a larger pore size. More preferred range is 85 to 100% by weight. On the other hand, when a non-solvent is not used in the starting solution, the non-solvent is preferably in an amount of at least 60% by weight. When the amount of the non-solvent is too large, the resin coagulates at a faster rate and the surface of the porous support layer becomes dense, but fine cracks can occur on the surface of the porous support layer. More preferred range is 60 to 99% by weight. When the temperature of the coagulation bath is too high, the coagulation rate becomes too fast, whereas when it is too low, the coagulation rate becomes too low, and thus, in general, it is preferable to select from within the range of 15 to 80° C. More preferred temperature range is 20 to 60° C.

The formation of a coating of the starting solution on the substrate, the method of bringing the coating into contact with a coagulation bath, and the density of the substrate used are the same as in the case where a pore-forming agent is not added.

The separation membrane prepared as described above has a structure in which the porous support layer (separation functional layer) is exposed on the surface on which the coating of the starting solution is formed and the porous substrate (nonwoven fabric) is exposed on the other surface, and, in the porous support layer, the average pore size on the surface on which the coating of the starting solution is formed is as small as ½ or less the average pore size on the other surface. This is because the surface on which the coating of the starting solution is formed is brought into contact with the coagulation bath faster than the other surface, and therefore the replacement speed between the starting solution and the coagulation bath is fast, resulting in formation of pores with a small size. For this reason, the separation membrane thus obtained is preferably used such that the surface on which the coating of the starting solution is formed is at the side of the permeate solution and the other surface at the side of the solution to be treated.

Either of the separation functional layers mentioned above may be subjected to a chemical treatment, for example, with a chlorine-containing compound, nitrous acid, or a coupling agent in order to improve the basic performance such as permeation performance and rejection performance.

For either separation functional layers, the thickness is not restricted, and the form of the separation membrane of i) is suitably employed, for example, as a reverse osmosis membrane, a forward osmosis membrane, or a nanofiltration membrane, in which case the thickness of the separation functional layer is preferably 5 to 3000 nm in terms of separation performance and permeation performance and particularly preferably 5 to 300 nm in terms of permeation performance. The thickness of the separation functional layer can be measured in accordance with a conventional method of measuring the membrane thickness of a separation membrane, for example, as follows: after a separation membrane is embedded in resin, an ultrathin section is prepared and subjected to a treatment such as staining, and then observed under a transmission electron microscope. The main measurement method is such that, in the case where the separation functional layer has a protuberance structure, the measurement is made in the direction of the cross-sectional length of the protuberance structure located above the porous support layer at 50-nm intervals with respect to 20 protuberances, and the thickness can be determined from the average.

On the other hand, in the case of the separation membrane in the form of ii) described above, the thickness of the separation functional layer is preferably 1 to 500 μm and more preferably in the range of 5 to 200 μm because when it is too thin, defects such as cracking occur in the separation functional layer and the filtration performance is readily degraded, whereas it is too thick, the permeation performance can be reduced.

Next, for the porous support layer, the size and distribution of the pores are not particularly restricted as long as the separation membrane is provided with mechanical strength and the separation membrane does not have a separation performance for low-molecular-size components such as ions. Specifically, any layers commonly referred to as a "porous support membrane" may be used, and examples thereof include a layer having uniform micropores or micropores gradually increasing in size from the surface on which the separation functional layer is formed to the other surface. Preferably used is a porous support layer having pores with a projection area equivalent diameter of 1 nm to 100 nm, which is measured on the surface on which the separation functional layer is formed using, for example, an atomic force microscope or an electron microscope. In particular, it is preferable to have a projection area equivalent diameter of 3 to 50 nm in terms of interfacial polycondensation reactivity and retentivity of a separation function membrane.

The thickness of the porous support layer is not particularly restricted and is preferably in the range of 20 to 500 μm and more preferably 30 to 300 μm in terms of strength of the separation membrane, formation of a height difference of the separation membrane, and form stability of a feed flow path.

The form of the porous support layer can be observed with a scanning electron microscope, a transmission electron microscope, or an atomic force microscope. For example, in the case of observation with a scanning electron microscope, the porous support membrane is peeled off from a substrate (nonwoven fabric), and then this is cut by freeze-fracture method to prepare a sample for cross-sectional observation. The sample is thinly coated with platinum, platinum-palladium, or ruthenium tetrachloride, preferably with ruthenium tetrachloride, and observed with an ultra-high resolution field-emission scanning electron microscope (UHR-FE-SEM) at an accelerating voltage of 3 to 6 kV. As an ultra-high resolution field-emission scanning electron microscope, for example, S-900 type electron microscope manufactured by Hitachi Ltd. can be used. The membrane thickness and the projection area equivalent diameter of the surface of the porous support layer are determined from the electron micrographs obtained. The thickness and pore size of the support layer is the average value, and the thickness of the support layer is the average value of the measurements at 20 points at 20-μm intervals in the direction perpendicular to the thickness direction in the cross-sectional observation. The pore size is the average value of each projection area equivalent diameter of 200 pores counted.

Next, as the substrate, a nonwoven fabric, which is a fibrous substrate, is used because it provides a moderate mechanical strength and controls the height difference on the separation membrane surface while maintaining the separation performance and permeation performance of the separation membrane.

As the nonwoven fabric, those comprising polyolefin, polyester, cellulose, and the like are used, and those comprising polyolefin and polyester are preferred in terms of formation of a height difference of the separation membrane and shape retention. Further, mixtures of a plurality of materials can also be used.

As the substrate, a continuous-fiber nonwoven fabric or a chopped fiber nonwoven fabric can preferably be used, and, in particular, a continuous-fiber nonwoven fabric can more preferably be used because the substrate requires such excellent membrane-forming properties that strike-through of a macromolecule polymer solution due to excessive permeation upon casting it, peeling-off of the porous support layer, or further defects such as ununiformity of the membrane and pinholes due to, for example, fluffing of the substrate will not occur. If the substrate comprises a continuous-fiber nonwoven fabric composed of thermoplastic continuous filaments, the ununiformity in casting a macromolecule solution resulting from fluffing, which occurs when a chopped fiber nonwoven fabric is used, and the membrane defects can be prevented. Further, in continuous membrane formation of the semipermeable membrane, a continuous-fiber nonwoven fabric which has more excellent dimension stability is preferably used as the substrate because a tension is applied in the membrane-forming direction. Particularly in the case of the separation membrane in the form of i) described above, a continuous-fiber nonwoven fabric is preferred in terms of strength and cost, and further a polyester continuous-fiber nonwoven fabric is preferred in terms of formability of a substrate.

In the continuous-fiber nonwoven fabric, in terms of formability and strength, fibers on the surface layer on the opposite side to the porous support layer are preferably more longitudinally oriented than fibers on the surface layer on the porous support layer side. According to such a structure, the strength can be retained to more reliably prevent membrane breakage and the like, and besides, in providing the separation membrane with unevenness, formability as a laminate comprising the porous support layer and the substrate is improved and the uneven shape of the separation membrane surface is stabilized, which is preferred. More specifically, in the continuous-fiber nonwoven fabric, the degree of fiber orientation in the surface layer opposite to the porous support layer is preferably 0° to 25°, and the degree of orientation difference from the degree of fiber orientation in the porous support layer-side surface layer is preferably 10° to 90°.

In the process for producing the semipermeable membrane and the process for producing the element, the heating step is involved and a phenomenon of shrinkage of the porous support layer or the separation functional layer due to the heating occurs. It is particularly noticeable in the width direction in which a tension is not applied during continuous membrane formation. Because the shrinking causes a problem, for example, with dimension stability, the substrate is desirably those which have a low rate of thermal dimensional change. In the nonwoven fabric, the difference between the degree of fiber orientation in the surface layer opposite to the porous support layer and the degree of fiber orientation in the porous support layer-side surface layer is preferably 10° to 90° because thermal change in the width direction can be prevented.

The degree of fiber orientation herein is an index indicating the direction of the fibers of a nonwoven fabric substrate constituting the porous support layer and refers to the average angle of the fibers constituting the nonwoven fabric substrate determined when the membrane-forming direction in performing continuous membrane formation is assumed to be 0° and the direction perpendicular to the membrane-forming direction, i.e., the width direction of the nonwoven fabric substrate is assumed to be 90°. Thus, it is shown that the closer the degree of fiber orientation is to 0°, the more the orientation is longitudinal, and the closer it is to 90°, the more the orientation is transverse.

With respect to the degree of fiber orientation, 10 small pieces of sample are randomly collected from a nonwoven fabric, and the surface of the sample is photographed at a magnification of 100 to 1000× with a scanning electron microscope. For 10 fibers from each sample, 100 fibers in total, the angle is measured assuming the longitudinal direction (lengthwise direction, membrane-forming direction) of the nonwoven fabric to be 0° and the width direction (transverse direction) of the nonwoven fabric 90°, and the average value thereof is rounded to whole numbers to determine the degree of fiber orientation.

Next, the permeate spacer in the present invention refers to a spacer in the separation membrane element in which source fluid is fed to one surface of the separation membrane to obtain permeate fluid from the other surface, which spacer is for highly efficiently collecting the permeate fluid separated from feed fluid to a member for collecting the permeate fluid such as a water collecting pipe. The permeate spacer, for example, is wound around the water collecting pipe together with the separation membrane described above to constitute a spiral-type separation membrane element.

To prevent sagging of the membrane and form a flow path at the permeate side, the permeate spacer needs to be made of a different material, a material different from that of the separation membrane. Because the separation membrane has a pore structure, the permeate spacer of a different material aids the pressure resistance and the durability. Further, in the present invention, the projection area ratio of the permeate spacer to the separation membrane needs to be 0.03 to 0.80 to form a pressure-resistant and highly efficient permeate flow path. The projection area ratio is preferably 0.10 to 0.70 and more preferably 0.20 to 0.70.

The projection area ratio herein refers to the value obtained by cutting out a separation membrane and a different material permeate spacer to 5 cm×5 cm and dividing the projection area obtained when the different material is projected from above the membrane surface by the cut area. When the permeate spacer made of a different material is integrated with a separation membrane as mentioned below, the separation membrane can be dissolved or peeled off to measure the projection area. For example, when the separation membrane is made of a polyamide separation functional layer, a polysulfone porous support layer, and a polyester nonwoven fabric and the permeate spacer is made of polyolefin, the permeate spacer is adhered using a film to which an adhesive tape or a two-component adhesive is applied, and the substrate is dissolved without changing the form of the permeate spacer, after which the projection area of the permeate spacer made of a different material that remains on the film to which an adhesive tape or a two-component adhesive is applied can be determined similarly to the method mentioned above. In dissolving the substrate in this process, the polyester nonwoven fabric may be dissolved, for example, by immersion in an alkaline solution with a pH of 13 for 24 hours. If the dissolution is insufficient, the immersion time may be extended to the extent that the permeate spacer is not damaged. Alternatively, using micro-IR, the surface may be measured in 1 μm×1 μm units to calculate the projection area of the spacer from parts where polyester, the substrate, is detected and parts where polyester is not detected.

The different material means a material that satisfies either of the composition or size different from that of the material used for the separation membrane. Accordingly, the material is not particularly limited as long as it satisfies any of the composition, pore size, and shape that are different from those of the materials of any of the separation functional layer, the porous support layer, and the substrate. In terms of pressure resistance and efficiency of the permeate flow path, those that satisfy all of the different composition, pore size, and shape are preferably used. When the permeate spacer is integrated with the separation membrane as mentioned below, those which are arranged on the back surface (the opposite side to the separation functional layer) of a nonwoven fabric that is substantially responsible for the mechanical strength of the separation membrane and which are of a material different from that of the nonwoven fabric are used as a permeate spacer.

The permeate spacer may be, for example, rod-like, cylindrical, dot-like, stripe-like, or a combination of these shapes and can be constituted of a foam material, a powder material, or further those made of a combination thereof. The composition is not particularly limited; in terms of chemical resistance, polyolefins such as polyethylene and polypropylene, copolymerized polyolefins, polyesters, and the like are preferred, and not only thermoplastic polymers but also heat- or photo-curable polymers can be used.

The method of arranging the permeate spacer on the separation membrane back surface is not particularly restricted. For example, when the permeate spacer has a continuous shape, the method of laminating a pre-processed spacer on the back side of the separation membrane is preferred. On the other hand, when the permeate spacer has a discontinuous shape, the method of forming and arranging a discontinuous substance of a different material directly on the back side of the separation membrane by means of; for example, printing or spraying is used. The continuous structure herein refers to a structure having no partial division like a knit or a net shape, and the discontinuous structure refers to such a structure that a permeate spacer is divided into a plurality of parts when the permeate spacer is peeled off from a separation membrane.

In the present invention, the permeate spacer preferably has a discontinuous structure in order to lower the flow resistance. For example, when a knit such as a tricot is arranged as a permeate spacer on the whole back surface of the separation membrane, because of the presence of warp and weft, parts where the different material and the membrane are in contact exist continuously over the whole separation membrane, i.e., the structure is continuous. Consequently, the flow resistance tends to increase. However, when the permeate spacer has a discontinuous structure, not only stable formation of a permeate flow path but also lower flow resistance can be achieved, and, further, high pressure resistance and low flow resistance can be simultaneously achieved by appropriately setting the interval between parts where the different material and the membrane are in contact.

When the permeate spacer has a discontinuous structure, the interval between the nearest two component members of the permeate spacer (i.e., the length between the two component members) is preferably 0.1 to 10 mm, and particularly in the case of a reverse osmosis membrane, it is preferably from 0.1 to 1 mm. The interval can be determined by measuring the cross-sectional slice structure of the permeate spacer and the membrane, for example, with a laser microscope or an electron microscope.

Further, to reduce sagging of the membrane and maintain low flow resistance, the pitch of the permeate spacer is preferably 0.1 to 3 mm. As the pitch of the permeate spacer, the average value of the center-to-center distances between adjacent two component members of the permeate spacer measured at 200 points is employed. When gaps of the component members do not exist at 200 points, measurements are made using all the gaps that exist.

In the present invention, in terms of pressure resistance and chemical resistance, the permeate spacer is preferably impregnated into the separation membrane by 1 to 80 μm and more preferably by 2 to 50 μm. The impregnation thickness of the permeate spacer into the separation membrane can be determined by measuring the cross-sectional slice structure of the permeate spacer and the membrane, for example, with a laser microscope or an electron microscope. When it is difficult to make an assessment with images, the impregnation thickness can be determined, for example, by analysis such as micro-IR.

In the present invention, in terms of separation performance, permeation performance, and feed flow path formation of the separation membrane element, the height difference on the separation membrane surface (the feed fluid side) is preferably in the range of 100 μm to 2000 μm. Further, to stabilize the feed flow path of the element and enhance separation and permeation performance, providing a height difference of 200 μm to 1500 μm and particularly preferably of 200 μm to 1000 μm is applied.

The height difference on the separation membrane surface, i.e., the separation functional layer surface can be measured by using, for example, commercially available shape measurement systems. For example, measurements can be made by height difference measurements from a cross section using a laser microscope, a high-precision shape measurement system KS-1000 manufactured by KEYENCE CORPORATION, and the like.

Examples of the method of providing height difference that can be used include, but are not limited to, the method of subjecting a separation membrane to embossing, water pressure formation, calendering, or the like, and, preferably, a heat treatment at 40 to 150° C. after formation of a separation membrane having a height difference can improve uneven shape retention. For the heat treatment temperature after the formation, the heat treatment temperature of polyester fibers can be identified using a known method by peeling only a substrate off the separation membrane and measuring the DSC of the substrate.

Examples of the process for producing a height difference that can preferably be used include, but are not limited to, processing a porous support layer, processing a substrate, processing a laminate obtained by laminating a porous support layer and a substrate, all of which are performed before producing a separation membrane, and processing a separation membrane on which a separation functional layer is formed.

Although the shape of the membrane surface having the height difference is not particularly restricted, it is important to reduce the flow resistance in the flow path and stabilize the flow path when fluid is fed and permeated through the separation membrane element. In these respects, the shape when observed from above the membrane surface is oval, circular, elliptic, trapezoid, triangular, rectangular, square, parallelogram, rhombic, or indeterminate, and examples of the shapes in three dimensions include such shapes that the shape from above the surface is shaped in the surface direction as it is, wideningly, and narrowingly.

The area of the convex region located above the center line of the height difference, in terms of the area observed from above the membrane surface (two-dimensional area), is preferably 5% to 80% based on the total membrane area, and particularly preferably 10 to 60% in terms of flow resistance and flow path stability.

In the present invention, it is suitable to arrange a feed spacer on the separation membrane surface (the feed fluid side) in order to obtain, particularly, a separation membrane element having an excellent long-term continuous operability.

As the feed spacer, for example, continuous structures such as a net can be employed. When a net is used as a feed spacer, although the flow resistance in the feed flow path slightly increases, the separation membrane element can be wound relatively at a high tension when winding it because the feed flow path is stably formed. Thus the net is preferred because it causes little change in the flow path upon operation, stoppage, and application of a pressure change and exhibits stable performance over a long period of time.

On the other hand, when a discontinuous structure is employed as the feed spacer, the flow resistance can be set low while reducing the concentration polarization of a solute, and the performance of the separation membrane element improves, which is preferred. Examples of usable shapes of each component member of such a feed spacer include oval, circular, elliptic, trapezoid, triangular, rectangular, square, parallelogram, rhombic, and indeterminate.

In particular, when the concentration of a solute in a feed fluid is high, the pitch of the feed spacer is preferably 1 to 100 mm, more preferably 3 to 50 mm, and particularly preferably 3 to 20 mm in order to prevent the concentration polarization and reduce the flow resistance.

The pitch of the feed spacer is also measured in the same manner as for the pitch of the permeate spacer. The continuous and discontinuous structure here have the same definition as those of the continuous and discontinuous structure of the permeate spacer mentioned above.

The method of producing the separation membrane element of the present invention will now be described in detail taking a reverse osmosis membrane element as an example.

Although the method of producing the separation membrane element of the present invention is not limited, the representative method will be described in which an element is produced by laminating a porous support layer and a polyamide separation functional layer on a substrate to obtain a separation membrane, then forming unevenness on the membrane surface, and further arranging a permeate spacer on the back surface side of the separation membrane. For example, the step of forming unevenness can be incorporated at any time before, during, or after the step of forming a separation membrane as mentioned below.

After combining a porous support layer with a substrate, a polyfunctional amine aqueous solution is applied to the porous support layer, and the excess amine aqueous solution is removed, for example, with an air knife, after which a polyfunctional acid halide-containing solution is applied to form a polyamide separation functional layer. The organic solvent is desirably one which is immiscible with water, dissolves polyfunctional acid halides, and does not break a porous support membrane, and it may be any solvent as long as it is inactive against polyfunctional amine compounds and polyfunctional acid halides. Preferred examples include hydrocarbon compounds such as n-hexane, n-octane, and n-decane. Further, to improve separation performance and permeation performance as required, the polyamide separation functional layer is subjected to a chemical treatment with, for example, chlorine, acids, alkalis, or nitrous acid, and further monomers and the like are washed to obtain a separation membrane. Thereafter, the separation membrane is provided on its surface (the separation functional layer side) with uneven shapes (conical, diameter: 1 mm, height: 0.7 mm, point R=0.2 mm, intervals: 5 mm), and the separation membrane preheated at 80° C. is passed through between calender rolls heated at 95° C. at a pressure of (100 kg/cm$^2$) to produce a continuous sheet of the separation membrane having a height difference.

Using the sheet and a conventional element-producing apparatus, units in which a net (for example, height: 500 µm, intervals: 3 mm) is arranged in place of a tricot on the back surface of the separation membrane (the substrate side) or units in which a permeate spacer of a different material is arranged in dots in place of a tricot on the substrate side of the separation membrane using a thermoplastic resin apparatus are provided to produce an 8-inch element with, for example, 26 leaves and an effective leaf area of 37 m$^2$. More specific examples of the method for producing an element that can be used include methods described in references (Japanese Patent No. 4596297, U.S. Pat. No. 6,656,362, and JP 2004-202371 A).

The separation membrane element of the present invention thus produced can further be connected in series or in parallel and housed in a pressure container to provide a separation membrane module.

Further, the separation membrane element and module described above can be combined, for example, with a pump for feeding fluid thereto and with an apparatus for pretreating the fluid to constitute a fluid separation apparatus. By using this apparatus, for example, raw water can be separated into permeate water such as drinking water and concentrated water that has not permeated through the membrane to obtain water for the intended purpose.

The higher the operating pressure of the fluid separation apparatus, the more the rejection rate improves, but the more the energy required for operation increases. Thus, for example, when obtain drinking water from raw water, in view of rejection rate and retention of a feed flow path and a permeate flow path of the membrane element, the operating pressure during passing raw water through a membrane module is preferably from 0.1 MPa to 8 MPa and more preferably from 0.2 MPa to 6 MPa. The temperature of feed water is preferably 3° C. to 60° C., because the higher it is, the more the salt rejection rate decreases, and the lower it is, the more the membrane permeate flux decreases.

When such a fluid separation apparatus is used, for example, in water purifier application, brackish water desalination application, or industrial water treatment, the desalination rate is preferably 97% or more. In particular, in brackish water desalination application, the desalination rate is more preferably 98% or more, and in applications that particularly require water quality, the desalination rate of 99% or more is desired.

When the pH of feed water is high, in the case of feed water of high salt concentration such as sea water, scale of magnesium and the like can occur, and there is a concern about membrane degradation due to the high pH operation. Thus, the operation in the neutral range is preferred. On the other hand, in chemical washing, a low pH to a high pH, addition of a chlorine compound, and washing chemicals can be used. The pH of 1 to 13 and a chlorine compound in an amount of 0.01 to 100 ppm can be used to the extent that the membrane performance is not degraded.

The fluid treated with the membrane element according to the present invention is not particularly limited, and when used in water treatment, examples of the raw water include liquid mixtures of, for example, sea water, brackish water, and wastewater, which mixtures contain a TDS (Total Dissolved Solids) of 500 mg/L to 100 g/L. In general, TDS refers to total dissolved solids and is expressed as "mass/volume" or "weight ratio". According to the definition, TDS can be calculated from the weight of residue after a solution filtered through a 0.45-micron filter has been evaporated at a temperature of 39.5 to 40.5° C., and, more conveniently, TDS is determined by conversion from practical salinity (S).

EXAMPLES

The present invention will now be described in more detail by way of example, but the present invention is not limited to these examples.

(Projection Area Ratio of Different Material on Back Surface of Separation Membrane)

Samples of a separation membrane and a different material permeate spacer were cut out to 5 cm×5 cm, and, using a laser microscope (magnification is selected from about 10 to 500×), the total projection area of the different material was measured by moving a stage. The projection area obtained when the different material was projected from above the membrane surface was divided by the cut area to obtain values. These steps were performed for three samples, and the average of the values obtained in each sample was employed as a projection area ratio.

(Height Difference on Separation Membrane Surface)

For the separation membrane surface of each sample cut out when determining the projection area ratio, the height difference between the highest portion and the lowest portion in neighboring uneven portions was measured using a high-precision shape measurement system KS-1000 manufactured by KEYENCE CORPORATION. to determine the average height difference. The height differences less than 10 μm were omitted and points having a height difference of not less than 10 μm were measured, and the value obtained by summing up each height value was divided by the number of the total measured points to make a determination. These steps were performed for three samples, and the average of the values obtained in each sample was employed.

(Degree of Fiber Orientation of Substrate)

Ten small pieces of sample were randomly collected from a nonwoven fabric, and photographs at a magnification of 100 to 1000× were taken with a scanning electron microscope. For 20 random fibers from each sample, 100 fibers in total, the angle was measured assuming the longitudinal direction (lengthwise direction) of the nonwoven fabric to be 0° and the width direction (transverse direction) of the nonwoven fabric 90°, and the average value thereof was rounded to whole numbers to determine the degree of fiber orientation.

(Desalination Rate (TDS Rejection Rate))

The electrical conductivity of raw water, permeate water, and concentrated water was measured, and a desalination rate was calculated by the following equation.

Desalination rate(TDS rejection rate)(%)={1−(2×TDS concentration of permeate water)/(TDS concentration of raw water+TDS concentration of concentrated water)}×100

(Water Producing Capacity)

The volume of feed water (brackish water) permeated through the membrane element was expressed as water producing capacity ($m^3$/day), permeate water volume ($m^3$) per day per membrane element.

(Long-Term Operability)

The separation membrane element was operated, and measurements for one hour were made, and then the operation was stopped after eight hours from the start. The retention of the permeate water volume after the operation and stoppage were repeated 10 times was determined by the following equation.

Permeate water volume retention (%)=100×(Permeate water volume after ten-times repetition)/Permeate water volume after one time Examples 1 to 3 and Comparative Examples 1 to 3

On a nonwoven fabric made of polyester continuous fibers (yarn diameter: 1 decitex, thickness: about 90 μm, air permeability: 1 cc/$cm^2$/sec, the degree of fiber orientation: 40° in the porous support layer-side surface layer and 20° in the surface layer on the opposite side to the porous support layer), a solution of 15.0% by weight polysulfone in dimethylformamide (DMF) was cast at a thickness of 180 μm at room temperature (25° C.), and the resultant was immediately immersed in pure water and left to stand for 5 minutes to thereby produce a porous support layer (thickness: 130 μm) roll composed of a fiber-reinforced polysulfone support membrane.

Thereafter, the porous support layer roll was rolled out, and an aqueous solution of 1.8% by weight of m-PDA and 4.5% by weight of ε-caprolactam was applied to the polysulfone surface. Nitrogen was blown thereto from an air nozzle to remove the excess aqueous solution from the support membrane surface, and then an n-decane solution at 25° C. containing 0.06% by weight of trimesic acid chloride was applied thereto such that the surface was completely wet. Thereafter, the excess solution was removed from the membrane by air blow, and the membrane was washed with hot water at 80° C. to obtain a roll of a separation membrane comprising a separation functional layer.

The separation membrane was embossed into the shape described in Table 1 to provide height difference on the separation membrane surface (the feed fluid side) and heat-treated at 90° C. for 1 minute.

Thereafter, the permeate spacer described in Table 2 was formed on the back side of the separation membrane with a nozzle-type thermoplastic resin processing machine, and the separation membrane was folded and dressed to obtain 26 leaves in which the permeate spacer is arranged outside the separation membrane. These 26 leaves were laminated such that the folded side was shifted in the lamination direction and, at the same time, joined to adjacent leaves at three sides other than the folded side. At this time, the effective area on the separation membrane element was arranged to be 37 $m^2$. DSC of the substrate was measured and an endothermic peak was observed near 90° C. The impregnation thickness of the permeate spacer into a substrate was 5 μm. In addition, the permeate spacer was a stripe-like rectangle such that the height/width ratio of each component member of the permeate spacer was 2:3 and formed such that the longitudinal direction of the component member of the permeate spacer was the longitudinal direction of the leaf (i.e., the direction perpendicular to the water collecting pipe).

The pitch at the feed flow path side of the separation membrane in the Table represents a horizontal distance from the highest point in one high area to the highest point in another adjacent high area on a separation membrane surface with height difference, and it is the average value of 200 counts. On the other hand, the pitch of the permeate spacer is the average value of the measurements at 200 points of center-to-center distance between adjacent two component members of the permeate spacer in the direction perpendicular to the central axis direction of a leaf of an element. For the projection area ratio, the values were rounded to two decimal places.

The laminate of the leaves described above was spirally wound around the water collecting pipe such that the folded side of the separation membrane was arranged inwardly in the radial direction of the water collecting pipe to produce a separation membrane element. A film was wound around the periphery and fixed with tape, and then edge cutting, attachment of an end plate, and filament winding were carried out to produce an 8-inch element.

The element was placed into a pressure vessel and operated under conditions of raw water containing 500 mg/L of salt, operating pressure: 0.7 MPa, operating temperature: 25° C., and pH: 7 (recovery: 15%). The performance was summarized in Table 3.

To change the projection area ratio of the permeate spacer, a tricot conventionally used was used in Comparative Example 1. In Examples 2 and 3 and Comparative Examples 2 and 3, while the height/width ratio of each component member of the permeate spacer was the same as in Example 1, the shape of shims of the nozzle-type thermoplastic resin processing machine, the discharge rate of a melt resin, and the discharge interval were changed.

As a result of the evaluation described above, in Examples 1 to 3, compared to Comparative Examples 2 and 3, the permeate water volume per unit time increased because the flow resistance at the permeate side was reduced. In particular, in Comparative Example 2 in which the projection area ratio was too low, sagging of the membrane between the permeate spacers was significant, and low permeate water volume retention decreased. On the other hand, when the projection area ratio was too high as in Comparative Example 3, the flow resistance at the permeate side increased and the initial permeate water volume was reduced.

The comparison of Example 1 with Comparative Example 1, in which a tricot was used as a permeate spacer, showed that despite the equivalent rejection rate, in Example 1, the flow resistance at the permeate side was reduced to significantly increase the permeate water volume, and the stripe-like permeate spacer showed little shape change even after a long-term operation to give the value of permeate water volume retention as high as 92%.

Example 4

Example 1 was repeated except that, when forming a permeate spacer on the back side of the separation membrane, the permeate spacer was formed once on a biaxially stretched polyester film (Lumirror S-type available from TORAY INDUSTRIES, INC: 50 μm) and then the permeate spacer was transferred onto a membrane substrate at 60° C., and that the impregnation thickness of the permeate spacer into a substrate was 0.6 μm.

As a result, the permeate water volume was as good as 45.6 m³/day, but the long-term operability was reduced to 82%.

Example 5

Example 1 was repeated except that, when forming a permeate spacer on the back side of the separation membrane, the process was performed at a drying temperature of 80° C. using a urethane solution coating machine and the impregnation thickness of the permeate spacer into a substrate was 82 μm.

As a result, the permeate water volume was 41.9 m³/day and the long-term operability was 90%.

Example 6

Example 5 was repeated except that the drying temperature after urethane solution coating was 110° C. and the impregnation thickness of the permeate spacer into a substrate was 50 μm.

As a result, the permeate water volume was 43.5 m³/day and the long-term operability was 92%.

Example 7

Example 5 was repeated except that the drying temperature after urethane solution coating was 90° C. and the impregnation thickness of the permeate spacer into a substrate was 75 μm.

As a result, the permeate water volume was 42.3 m³/day and the long-term operability was 92%.

Example 8

Example 1 was repeated except that the substrate was changed to one having a degree of fiber orientation of 20° in the porous support layer-side surface layer and 40° in the surface layer on the opposite side to the porous support layer.

As a result, the permeate water volume was 46.2 m³/day and the long-term operability was 83%, but the formability in providing the separation membrane surface with unevenness was decreased and the desalination rate decreased to 98.1%.

Example 9

Example 1 was repeated except that the conditions of the separation membrane and the permeate spacer were changed as shown in Tables 1 and 2. In forming a separation functional layer, isophthalic acid chloride was added such that its molar ratio to trimesic acid chloride was 0.2. The oval shaped unevenness on the separation membrane surface (the feed fluid side) was obtained by water pressure formation in such a manner that the major axis direction of the oval was perpendicular to the water collecting pipe of the element, followed by heat treatment at 60° C. for 1 minute.

As a result, as shown in Table 3, the rejection performance was particularly excellent, whereas the value of the long-term operability was somewhat low because the pitch of the permeate spacer was large.

Example 10

Example 1 was repeated except that the conditions of the separation membrane and the permeate spacer were changed as shown in Tables 1 and 2 and that a heat treatment was not performed after the embossing for providing the separation membrane surface with an uneven shape.

As a result, the water producing capacity improved, whereas the rejection rate somewhat decreased.

Example 11

Example 1 was repeated except that the conditions of the separation membrane and the permeate spacer were changed as shown in Tables 1 and 2. When forming a separation functional layer, isophthalic acid chloride was added such that its molar ratio to trimesic acid chloride was 1.0. To provide the separation membrane surface with an uneven shape, in place of embossing, the separation membrane and a semicircular PP sheet were laminated and calendered (90° C., 5 MPa).

As a result, the impregnation thickness into a substrate was 32 μm, and the rejection rate, the water producing capacity, and the long-term operability were stabilized.

Example 12

The conditions of the separation membrane and the permeate spacer were changed as shown in Tables 1 and 2. In addition, instead of providing the separation membrane after forming a separation functional layer with an uneven shape, the porous support layer of polysulfone was provided with an uneven shape by metal embossing, and then a separation functional layer was formed by interfacial polycondensation without performing a heat treatment. Further, a net with a continuous structure was arranged as a permeate spacer. Except the above, Example 11 was repeated.

As a result, compared to Example 1, the projection area ratio of the permeate spacer being high and the shape of the permeate spacer being a net with a continuous structure, both the permeate water volume and the permeate water volume retention were reduced compared to Example 1.

Example 13

Example 12 was repeated except that the conditions of the separation membrane and the permeate spacer were changed as shown in Tables 1 and 2.

As a result, compared to Example 1, the projection area ratio of the permeate spacer being high and the shape of the permeate spacer being a net with a continuous structure, both the permeate water volume and the permeate water volume retention were reduced compared to Example 1.

Example 14

Example 1 was repeated except that instead of not providing the separation membrane surface (the feed fluid side) with height difference, a feed spacer of polyethylene net having a continuous structure (yarn diameter: 1100 μm, pitch between intersections of net yarn: 6 mm) shown in Table 1 was arranged.

As a result, compared to Example 1, the permeate water volume was reduced but the long-term operability improved.

Example 15

Example 1 was repeated except that instead of not providing the separation membrane surface (the feed fluid side) with height difference, a feed spacer having a discontinuous structure (dots of semicircular PVC foam resin with a pitch of 3 mm, a diameter of 0.5 mm, and a height of 300 μm) shown in Table 1 was arranged.

As a result, compared to Example 1, the permeate water volume was reduced but the long-term operability improved.

Example 16

Example 1 was repeated except that the substrate was changed from the continuous-fiber nonwoven fabric to a nonwoven fabric obtained by a paper-making process. As a result, the formability was reduced, and the desalination rate decreased to 97.2%.

Example 17

Using a polyvinylidene fluoride (PVDF) resin and N,N-dimethylacetamide (DMAc) as a solvent, these were stirred sufficiently at a temperature of 90° C. to obtain a starting solution of PVDF: 13.0% by weight and DMAc: 87.0% by weight.

Next, the starting solution described above was cooled to 25° C., then applied to a polyester fiber nonwoven fabric having a density of 0.48 g/cm$^3$ and a thickness of 220 μm stuck in advance on a glass plate, and immediately immersed in a coagulation bath at 25° C. having the following composition for 5 minutes to obtain a separation membrane in which a porous support layer (separation functional layer) is formed.

Water: 30.0% by weight
DMAc: 70.0% by weight

The separation membrane described above was provided with the same permeate spacer (projection area ratio: 0.10) as that of Example 11.

Then, as shown in Patent Document 4, the separation membrane was stuck to both surfaces of a 320-mm-long, 220-mm-wide, and 5-mm-thick support plate having a permeate water outtake on its top such that the surface of the separation membrane which had been contacted with the coagulation bath (separation functional layer) was on the opposite side to the support plate side to obtain an element.

This element was placed in a 500-mm-long, 150-mm-wide, and 700-mm-high tank having an air nozzle at its bottom and containing activated sludge in a concentration of 3,000 mg/liter, and, while feeding air from the air nozzle at 210 liter/min, a permeation test was carried out at a filtration linear velocity of 0.4 m/day. In this permeation test, the initial filtration pressure difference in terms of 25° C. was 0.4 kPa, and the filtration pressure difference after 2,000 hours was 1.2 kPa. After performing the backwashing in which pure water was fed from the permeate solution side of this element at a filtration linear velocity of 0.4 m/day for 1 hour, a permeation test was carried out again similarly to the above, and the filtration pressure difference recovered to 0.5 kPa.

TABLE 1

| | Feed-side passage | | | | | Separation membrane | |
|---|---|---|---|---|---|---|---|
| | Difference in height μm | Geometry of convex portion — | Span of convex portion (long span × short span)* μm | Pitch mm | Different material — | Constitution — | Thickness μm |
| Example 1 | 300 | net geometry | 1000 | 5 | absence | PA/PSf/PET non woven fabric | —/50/80 |
| Example 2 | 300 | net geometry | 1000 | 5 | absence | PA/PSf/PET non woven fabric | —/50/80 |
| Example 3 | 300 | net geometry | 1000 | 5 | absence | PA/PSf/PET non woven fabric | —/50/80 |
| Example 4 | 300 | net geometry | 1000 | 5 | absence | PA/PSf/PET non woven fabric | —/50/80 |
| Example 5 | 300 | net geometry | 1000 | 5 | absence | PA/PSf/PET non woven fabric | —/50/100 |
| Example 6 | 300 | net geometry | 1000 | 5 | absence | PA/PSf/PET non woven fabric | —/50/80 |
| Example 7 | 300 | net geometry | 1000 | 5 | absence | PA/PSf/PET non woven fabric | —/30/100 |
| Example 8 | 300 | net geometry | 1000 | 5 | absence | PA/PSf/PET non woven fabric | —/50/80 |
| Example 9 | 210 | ellipse | 1200 × 500 | 8 | absence | PA/PSf/PET non woven fabric | —/40/100 |
| Example 10 | 1510 | columnar | 1000 | 3 | absence | PA/PSf/PET non woven fabric | —/50/200 |
| Example 11 | 450 | semicircular | 1000 | 5 | absence | PA/PSf/PET non woven fabric | —/50/150 |
| Example 12 | 500 | columnar | 800 | 5 | absence | PA/PSf/PET non woven fabric | —/40/100 |
| Example 13 | 600 | ellipse | 500 × 200 | 3 | absence | PA/PSf/PET non woven fabric | —/40/100 |
| Example 14 | | | | 6 | presence | PA/PSf/PET non woven fabric | —/50/80 |
| Example 15 | | | | 3 | presence | PA/PSf/PET non woven fabric | —/50/80 |
| Example 16 | 300 | net geometry | 1000 | 5 | absence | PA/PSf/PET paper | —/50/80 |
| Comparative Example 1 | 300 | net geometry | 1000 | 5 | absence | PA/PSf/PET non woven fabric | —/50/80 |
| Comparative Example 2 | 300 | net geometry | 1000 | 5 | absence | PA/PSf/PET non woven fabric | —/50/80 |
| Comparative Example 3 | 300 | net geometry | 1000 | 5 | absence | PA/PSf/PET non woven fabric | —/50/80 |

*long span means major axis and short span means minor axis.
Thickness of PA is about 0.1 μm.

TABLE 2

| | Permeation-side passage material | | | | | |
|---|---|---|---|---|---|---|
| | Material — | Structure | Geometry — | Span (Width) μm | Pitch mm | Ratio of the projection area — |
| Example 1 | Polyester * | discontinuous | striped | 500 | 1 | 0.50 |
| Example 2 | Polyester * | discontinuous | striped | 300 | 1.5 | 0.20 |
| Example 3 | Polyester * | discontinuous | striped | 560 | 0.8 | 0.70 |
| Example 4 | Polyester * | discontinuous | striped | 500 | 1 | 0.50 |
| Example 5 | Polyurethane | discontinuous | striped | 500 | 1 | 0.50 |
| Example 6 | Polyurethane | discontinuous | striped | 500 | 1 | 0.50 |
| Example 7 | Polyurethane | discontinuous | striped | 500 | 1 | 0.50 |
| Example 8 | Polyester * | discontinuous | striped | 500 | 1 | 0.50 |
| Example 9 | Polyester * | discontinuous | striped | 2000 | 4 | 0.50 |
| Example 10 | EVA | discontinuous | dot geometry | 1000 | 5 | 0.05 |
| Example 11 | EVA | discontinuous | dot geometry | 500 | 3 | 0.10 |
| Example 12 | PET | continuous | net geometry | 400 | 3 | 0.60 |
| Example 13 | PET | continuous | net geometry | 400 | 1 | 0.80 |
| Example 14 | Polyester * | discontinuous | striped | 500 | 1 | 0.50 |
| Example 15 | Polyester * | discontinuous | striped | 500 | 1 | 0.50 |
| Example 16 | Polyester * | discontinuous | striped | 500 | 1 | 0.50 |
| Comparative Example 1 | PET | continuous | tricot (knitted fabric) | 100 | 0.3 | 0.82 |
| Comparative Example 2 | Polyester * | discontinuous | striped | 200 | 10 | 0.02 |

TABLE 2-continued

| | Permeation-side passage material | | | | | |
|---|---|---|---|---|---|---|
| | Material | Structure | Geometry | Span (Width) μm | Pitch mm | Ratio of the projection area |
| Comparative Example 3 | Polyester * | discontinuous | striped | 450 | 0.5 | 0.90 |

* Polyester: polyester type hot-melt adhesive "Aron Melt" PES-120 L (manufactured by Toa Gosei Co.,

TABLE 3

| | TDS % | Water permeability m³/day | Water permeability retention % |
|---|---|---|---|
| Example 1 | 99.3 | 47.8 | 92 |
| Example 2 | 99.2 | 48.9 | 81 |
| Example 3 | 99.4 | 43.1 | 94 |
| Example 4 | 99 | 45.6 | 82 |
| Example 5 | 99.3 | 41.9 | 90 |
| Example 6 | 99.3 | 43.5 | 92 |
| Example 7 | 99.3 | 42.3 | 92 |
| Example 8 | 98.1 | 46.2 | 83 |
| Example 9 | 99.4 | 47.1 | 82 |
| Example 10 | 99.0 | 50.1 | 81 |
| Example 11 | 99.5 | 48.2 | 88 |
| Example 12 | 99.1 | 43.2 | 86 |
| Example 13 | 99.4 | 44 | 86 |
| Example 14 | 99.2 | 44.8 | 93 |
| Example 15 | 99.3 | 45.6 | 93 |
| Example 16 | 97.2 | 43.1 | 89 |
| Comparative Example 1 | 99.3 | 41.2 | 90 |
| Comparative Example 2 | 98.3 | 18.3 | 55 |
| Comparative Example 3 | 99.3 | 24.1 | 90 |

As described above, the separation membrane element obtained by the present invention has high water producing performance, provides stable operation over a long period of time, and has excellent rejection performance.

INDUSTRIAL APPLICABILITY

The separation membrane element of the present invention can be suitably used particularly in desalination of brackish water and sea water and sewage/wastewater treatment.

DESCRIPTION OF SYMBOLS

1: Separation membrane surface (feed fluid side)
2: Separation membrane back surface (permeate fluid side)
3: Permeate spacer of a different material

The invention claimed is:

1. A separation membrane element comprising a separation membrane and a permeate spacer, wherein
a separation functional layer is arranged on the front surface of said separation membrane and a nonwoven fabric that serves as a substrate is arranged on the back surface of said separation membrane,
said permeate spacer is arranged on the back surface side of said substrate,
said permeate spacer is made of a material different from said separation membrane and has a discontinuous structure having striped or dot geometry formed and arranged directly on the back side of the separation membrane by means of printing, spraying or thermoplastic resin processing,
said permeate spacer is impregnated into said separation membrane, and in the case said permeate spacer has a discontinuous structure having dot geometry, a span width of the permeate spacer is 500 μm to 1000 μm, a pitch of the permeate spacer is 3 mm to 5 mm and a projection area ratio of said permeate spacer to said separation membrane is 0.05 to 0.10, and in the case said permeate spacer has a discontinuous structure having striped geometry, a span width of the permeate spacer is 300 μm to 560 μm, a pitch of the permeate spacer is 0.8 mm to 1.5 mm and a projection area ratio of said permeate spacer to said separation membrane is 0.20 to 0.70.

2. The separation membrane element according to claim 1, wherein an impregnation thickness of the permeate spacer into a substrate is in the range of 1 μm to 80 μm.

3. The separation membrane element according to claim 2, wherein said separation membrane has a height difference on the surface of 100 μm to 2000 μm.

4. The separation membrane element according to claim 2, wherein a feed spacer is arranged on the surface of said separation membrane.

5. The separation membrane element according to claim 1, wherein said separation membrane has a height difference on the surface of 100 μm to 2000 μm.

6. The separation membrane element according to claim 1, wherein a feed spacer is arranged on the surface of said separation membrane.

7. The separation membrane element according to claim 6, wherein said feed spacer has a continuous structure.

8. The separation membrane element according to claim 6, wherein said feed spacer has a discontinuous structure.

9. The separation membrane element according to claim 1, wherein said separation membrane is composed of said substrate and the separation functional layer formed on the substrate.

10. The separation membrane element according to claim 1, wherein said permeate spacer has a structure divided into a plurality of parts if the permeate spacer is removed from the separation membrane.

11. The separation membrane element according to claim 1, wherein said permeate spacer has a structure that includes a plurality of component members arranged such that the distance between the nearest two component members of the permeate spacer structure is 0.8 mm to 1 mm.

* * * * *